(12) United States Patent
Li et al.

(10) Patent No.: US 10,394,674 B2
(45) Date of Patent: Aug. 27, 2019

(54) LOCAL RECOVERY OF ELECTRONIC SUBSCRIBER IDENTITY MODULE (ESIM) INSTALLATION FLOW

(71) Applicant: Apple Inc., Cupertino, CA (US)

(72) Inventors: Li Li, Los Altos, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/684,806

(22) Filed: Aug. 23, 2017

(65) Prior Publication Data

US 2018/0060199 A1   Mar. 1, 2018

Related U.S. Application Data

(60) Provisional application No. 62/379,187, filed on Aug. 24, 2016.

(51) Int. Cl.
| | |
|---|---|
| *G06F 11/00* | (2006.01) |
| *G06F 11/20* | (2006.01) |
| *G06F 9/4401* | (2018.01) |
| *G06F 21/60* | (2013.01) |
| *G06F 21/45* | (2013.01) |
| *G06F 8/61* | (2018.01) |

(52) U.S. Cl.
CPC .......... *G06F 11/2094* (2013.01); *G06F 8/61* (2013.01); *G06F 9/4401* (2013.01); *G06F 21/45* (2013.01); *G06F 21/602* (2013.01)

(58) Field of Classification Search
CPC ......... H04L 9/38; H04L 9/3066; H04L 9/321; H04L 9/3252; H04L 9/3265; H04L 63/0823
See application file for complete search history.

(56) References Cited

U.S. PATENT DOCUMENTS

| 8,306,518 | B1 * | 11/2012 | Gailloux | H04L 41/0813 |
| | | | | 455/418 |
| 8,849,278 | B2 * | 9/2014 | Bush | H04W 8/265 |
| | | | | 455/435.1 |

(Continued)

OTHER PUBLICATIONS

GSM Association, Official Document SGP.22—RSP Technical Specification, RSP Technical Specification, Version 1.1, Jun. 9, 2016, pp. 1-125.

*Primary Examiner* — Bryce P Bonzo
*Assistant Examiner* — Jeison C Arcos
(74) *Attorney, Agent, or Firm* — Dickinson Wright RLLP

(57) ABSTRACT

A device hosting a universal integrated circuit card (UICC or eUICC) initiates an electronic subscriber identity module (eSIM) installation flow with an SIM server. The purpose of the eSIM installation flow is to perform a profile provisioning action. The device and, for example, the eUICC preserve state information related to the eSIM installation flow. The eSIM installation flow includes generation of a one-time public key at the eUICC. In some instances, the eSIM installation flow may be interrupted by an error event before successful installation of the eSIM in the eUICC. A subsequent renewed installation attempt is locally initiated and completed without assistance of the eSIM server. In some embodiments, the recovery and subsequent successful eSIM installation make use of the state information preserved during the earlier eSIM installation flow.

20 Claims, 9 Drawing Sheets

(56) References Cited

U.S. PATENT DOCUMENTS

| | | | |
|---|---|---|---|
| 8,887,257 B2* | 11/2014 | Haggerty | H04L 63/0272 726/9 |
| 10,142,917 B2* | 11/2018 | Narasimhan | H04W 8/02 |
| 2002/0126850 A1* | 9/2002 | Allen | H04L 9/0825 380/277 |
| 2005/0079863 A1* | 4/2005 | Macaluso | H04M 1/72525 455/419 |
| 2006/0035631 A1* | 2/2006 | White | H04M 3/382 455/418 |
| 2011/0075608 A1* | 3/2011 | Chai | H04W 48/18 370/328 |
| 2012/0260090 A1* | 10/2012 | Hauck | H04L 63/0853 713/168 |
| 2013/0303122 A1* | 11/2013 | Li | H04W 8/20 455/411 |
| 2014/0143826 A1* | 5/2014 | Sharp | G06F 21/604 726/1 |
| 2015/0143125 A1* | 5/2015 | Nix | H04W 4/70 713/171 |
| 2015/0296379 A1* | 10/2015 | Nix | H04L 9/0869 713/171 |
| 2016/0105411 A1* | 4/2016 | Vallieres | H04L 9/12 726/3 |
| 2016/0302061 A1* | 10/2016 | Park | H04W 12/04 |
| 2016/0302070 A1* | 10/2016 | Yang | H04W 4/50 |
| 2016/0330175 A1* | 11/2016 | Li | G06F 8/65 |
| 2016/0337780 A1* | 11/2016 | Li | H04W 8/20 |
| 2017/0142121 A1* | 5/2017 | Lee | H04L 63/0823 |
| 2017/0279619 A1* | 9/2017 | Yang | H04L 9/3268 |
| 2018/0351945 A1* | 12/2018 | Li | H04L 63/0853 |

\* cited by examiner

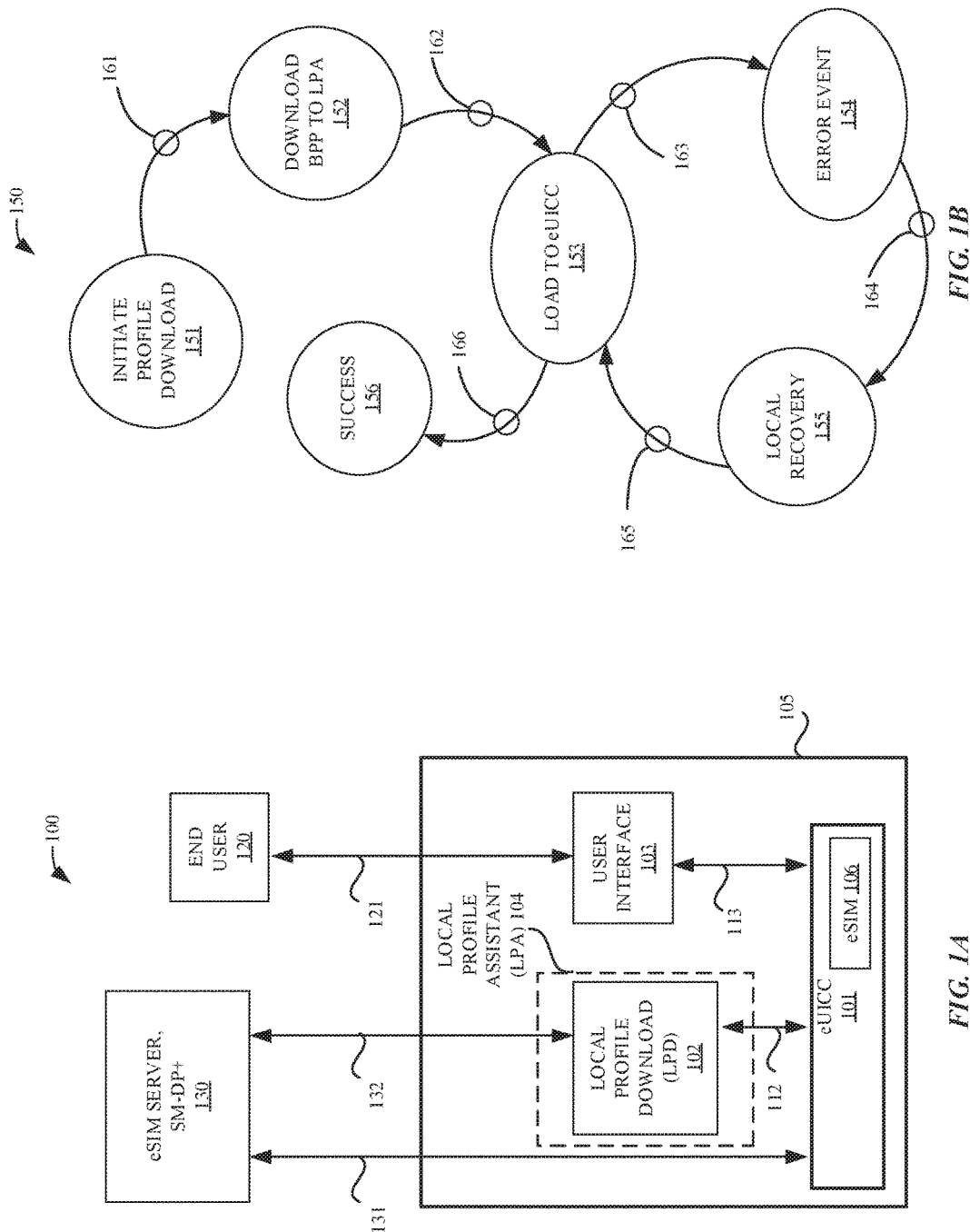

LOCAL RECOVERY OF ELECTRONIC SUBSCRIBER IDENTITY MODULE (ESIM) INSTALLATION FLOW

CROSS REFERENCE TO RELATED APPLICATIONS

This application claims benefit of U.S. Provisional Patent Application No. 62/379,187 entitled "LOCAL RECOVERY OF ELECTRONIC SUBSCRIBER IDENTITY MODULE (eSIM) INSTALLATION FLOW," filed Aug. 24, 2016, which is hereby incorporated by reference.

FIELD

The described embodiments relate to recovering from an error during an electronic subscriber identity module (eSIM) installation flow.

BACKGROUND

A wireless device can be provisioned with a profile (also referred to herein as an eSIM). Various network entities participate in provisioning of an eSIM to a secure element (SE). The SE may be, for example, an embedded universal integrated circuit card (eUICC) or universal integrated circuit card (UICC), where the eUICC or UICC is housed in a wireless device. Inefficiencies can arise if an error event occurs during eSIM installation flow designed, for example, to provide a profile to the eUICC. An eSIM installation flow may also be referred to herein as a profile download flow.

Aspects of eSIM provisioning include the downloading, installing, enabling, disabling, switching and deleting of a profile on an SE. A profile is a combination of operator data and applications provisioned on an eUICC in a device for the purposes of providing services by an operator, for example, a mobile network operator (MNO). A profile can contain one or more secure data used to prove identity and thus verify contract rights to services. To establish trust between communicating entities, public key infrastructure (PKI) techniques can be used. During assembly of a device, the eUICC can be inserted into the wireless device. The wireless device can include a local profile assistant (LPA). The LPA is involved with installation of a new eSIM into the eUICC of the device.

A profile can be identified by a unique number called an ICCID (Integrated Circuit Card Identifier). A wireless operator is a company providing wireless cellular network services. An MNO is an entity providing access capability and communication services to its subscribers through a mobile network infrastructure. In some cases, the wireless device is user equipment used in conjunction with an eUICC to connect to a mobile network. A wireless device may also be referred to herein as simply a device. An end user or customer is a person using a device. An enabled profile can include files and/or applications which are selectable over an eUICC-device interface.

Some profile downloads are triggered when a device pulls a notification message from a root server, where the notification is first pushed to the root server by an eSIM server. The root server, in some instances, may be referred to as a subscription manager discovery service (SMDS) server. The notification can include an event identifier and an address of the eSIM server. The device proceeds to inquire of the eSIM server about the event identifier, reaching the eSIM server using the eSIM server address of the notification.

A document related to remote provisioning and management of eUICCs in devices is GSM Association document GSMA SGP.22: "RSP Technical Specification," Version 1.1 Jun. 9, 2016 (hereinafter "SGP.22").

SUMMARY

Representative embodiments set forth herein disclose various systems and techniques for recovering from an error during provisioning of an eSIM to an SE.

During a profile download, an error event may occur. To reduce loading on the eSIM server providing the bound profile package (BPP) and to relieve the end user of a task of repeated download attempts, embodiments provided herein renew the download process with activities focused on the LPA and the eUICC.

An eSIM installation flow, in some instances, begins with an initiation phase including a contract subscription process. Various information is sent to an MNO associated with the desired subscription. The MNO communicates with an eSIM server to order an eSIM of a particular profile type. The eSIM server reserves a particular eSIM and sends a profile identifier value to the MNO. The MNO then sends the device the eSIM server address and, in some instances, additional information. In some embodiments, the end user completes their portion of the subscription process using a menu in the LPA to enter an activation code.

Next, an authentication and information exchange phase of the profile download process occurs, in which the eSIM server and the eUICC authenticate each other; during the process the eSIM server generates a transaction identifier. The eSIM server sends the transaction identifier and other information to the LPA. The LPA then sends a download preparation message. The download preparation message conveys to the eUICC information such as the transaction identifier, an eSIM server identifier, and a cryptographic signature value. The eUICC then creates a one-time key pair for use during the profile download (eSIM installation). The eUICC prepares a cryptographically signed data object to be sent to the eSIM server. A eUICC represents simply one embodiment of an SE.

In some embodiments, the eUICC then creates an entry in a download state table. The entry may be referred to herein as a download session entry or as an RSP session entry. The download session entry can include one or more of the following values: i) an eSIM server identifier value, ii) the transaction identifier, and/or iii) the eUICC one-time key pair.

The eUICC then sends the signed data object comprising the transaction identifier to the LPA. The LPA solicits download of the BPP, comprising the profile, from the eSIM server. The eSIM server recognizes the transaction identifier in the request message and sends the BPP to the LPA. The LPA stores the BPP in a non-volatile memory of the device as a precaution in case of a need for a renewed installation attempt arises.

The LPA commences to convey portions of the BPP to the eUICC using a loading command or a series of loading commands. After receiving a first loading command, the eUICC, in some embodiments, stores information related to the eSIM installation in a state table and calculates a session key for use in deciphering portions of the BPP. An eSIM server public key and an identifier value of the eSIM being installed are added to the download session entry during the eUICC processing of the BPP.

In some instances, an error event can occur during profile download from the eSIM server or during loading of the BPP from the LPA to the eUICC. The eUICC recognizes the error event and reports the error event to the LPA. In some embodiments, the eUICC categorizes the error event as a substantial failure or as a temporary failure. A substantial failure can be, for example, related to a flaw in the BPP or related to other causes.

In the case of a substantial failure, re-commencement of the profile download using the BPP stored in the device may not succeed. Thus, in the case of a substantial failure, the LPA will report the failure to the eSIM server with an error code, and the eSIM server will initiate a corrective action.

In the case of a temporary failure, the LPA and the eUICC work together, in some embodiments, to recover from the temporary failure by means of a renewed installation attempt. In some embodiments, the LPA queries the eUICC to determine one or more of the download session entries in the download state table. The LPA, in some embodiments, evaluates a retry counter before attempting a second download.

In some instances, the LPA performs corrective action to achieve a successful profile loading into the eUICC without involving the eSIM server in the retry attempt. In some embodiments, the LPA again sends a portion of the BPP to the eUICC in a second loading attempt, also referred to herein as a renewed installation attempt. The eUICC uses the state table to process the portions of the BPP arriving in the second loading attempt. In some instances, the second loading attempt proceeds with no second error event; i.e., the profile is successfully installed from the BPP into the eUICC on the second attempt.

The LPA, in some embodiments, solicits notifications from the eUICC after completing the BPP loading. This can be done with one or more request messages. The eUICC then provides the first and second notifications to the LPA. In some embodiments, the LPA then forwards the first and second notifications to the eSIM server. In some embodiments, the LPA only sends the second notification to the eSIM server, because the information in the first notification has been made stale by the successful loading on the second profile loading attempt.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 1A illustrates an exemplary system for provisioning an eUICC with an eSIM, according to some embodiments.

FIG. 1B illustrates an exemplary state diagram for the system of FIG. 1A recovering from an error event, according to some embodiments.

In FIG. 8B, the eUICC to be provisioned with an eSIM is located in an accessory device in communication with a primary device, according to some embodiments.

DETAILED DESCRIPTION

Figure 2A:
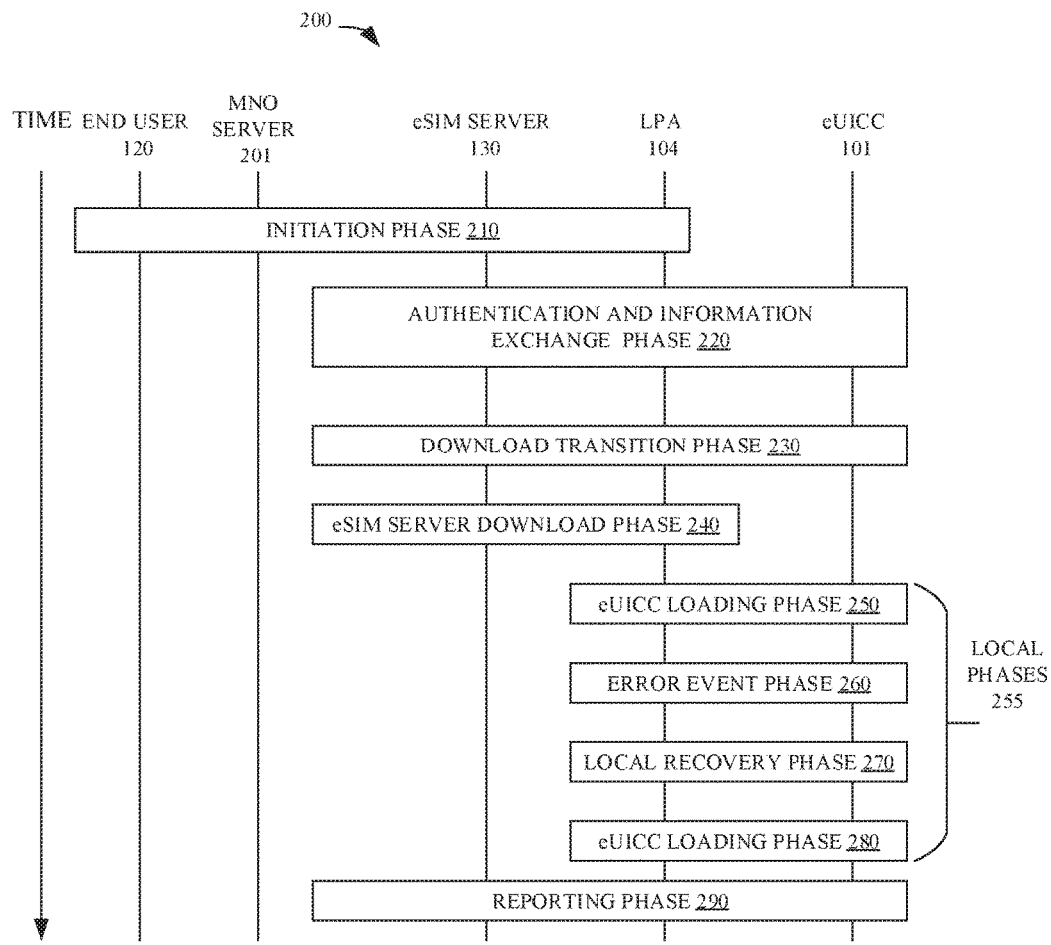
FIG. 2A illustrates exemplary phases in an eSIM installation flow including a local recovery phase, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can be provisioned with an eSIM. Inefficiencies can occur if an error event occurs during an eSIM installation flow. Embodiments disclosed herein avoid or mitigate inefficiencies by retaining state information in a device and/or in an eUICC and then recovering from the error event based on the state information. Information related to eSIM provisioning, devices, eUICCs, PKI techniques, and elliptic curve cryptography is also provided below.

Local Recovery of eSIM Installation Flow

During a profile download, an error event may occur, as mentioned above. To reduce loading on the eSIM server providing the BPP and to relieve the end user of renewing download attempts, embodiments provided herein renew the download process with activities at the device LPA and at the eUICC.

An eSIM installation (profile download) flow or process, in some instances, begins with an initiation phase including a contract subscription process. Billing information, an eUICC identifier (EID), a device identifier (IMEI), and device capabilities, in some instances, are sent to an MNO server. This information may be sent from the device intended to receive the eSIM or from another device. The MNO communicates with an eSIM server to order an eSIM of a particular profile type. The eSIM server reserves a particular eSIM associated with an identifier (ICCID value) and sends the ICCID value to the MNO. The MNO then sends the device the eSIM server address and, in some instances, a confirmation code. The eSIM server address can be a portion of an activation code.

In some embodiments, the end user completes the subscription process using a menu in the LPA to enter the activation code. For example, the activation code can be entered by manual typing or by QR code scanning. The LPA parses the activation code to recover the eSIM server address and, in some instances, the eSIM server OID value. In some instances, the user also enters the confirmation code.

Next, an authentication and information exchange phase of the profile download process occurs. In this phase, the LPA requests a challenge value from the eUICC. The eUICC generates a challenge which will be signed later by the eSIM server for authentication of the eSIM server by the eUICC. The LPA also requests eUICC information such as PKI certificate information, EID prefix, profile package versions supported, and/or firmware version. The LPA then establishes an HTTPS connection and calls an InitiateAuthentication function to perform authentication with the eSIM server. At this point, the eSIM server generates a transaction identifier. The eSIM server sends to the LPA the transaction identifier, a server challenge, and other information. The eSIM server will perform a cryptographic signing operation over data including the server challenge and return the resulting signature to the eUICC to authenticate the eSIM server.

Upon successful authentication of the eSIM server, the eUICC sends a response back to the eSIM server, including a signature over data such as the transaction ID, the server challenge, and context parameters to prove eSIM ownership by the eUICC. The eSIM server (also referred to herein as an SM-DP+) authenticates the eUICC and verifies that there is a pending profile (eSIM) reserved for the eUICC. If there is a profile reserved for the eUICC, the eSIM server signs a data blob including the transaction identifier (also referred to herein as a transactionID) and sends the signed data blob to the LPA.

The LPA then sends, to the eUICC, a download preparation message such as the PrepareDownload function or message. The download preparation message conveys to the eUICC the signed data blob including the transaction identifier. In some instances, an error occurs during transmission or reception of the download preparation message. In some embodiments, the LPA resends the download preparation message after the error without restarting the session and without requesting help from the eSIM server.

The eUICC then authenticates the eSIM server based on the received download preparation message. Following successful authentication of the eSIM server, the eUICC creates otPK.EUICC.ECKA and otSK.EUICC.ECKA keys as part of an elliptic curve key agreement (ECKA) procedure. Also, the eUICC performs an elliptic curve digital signature algorithm (ECDSA), using a key value SK.EUICC.ECDSA, to produce an euiccSignature2 value over a data object comprising the transaction identifier and otPK.EUICC.ECKA. In some embodiments, authentication and encryption procedures are based on Rivest-Shamir-Adleman (RSA) PKI techniques. ECDSA PKI certificates are associated with each of the eSIM server and the eUICC before the initiation phase begins. The eUICC prepares the data object to be sent to the eSIM server. An example of such a data object in SGP.22 is the euiccSigned2 data structure.

In some embodiments, the eUICC then creates an entry in a download state table. The entry is, for example, an RSP session entry or a download session entry. The download session entry can include one or more of the following values: i) an eSIM server OID value, ii) the transaction identifier, iii) otPK.EUICC.ECKA, iv) otSK.EUICC.ECKA, and/or vi) euiccSignature1.

The eUICC then sends the signed data object comprising the transaction identifier and otPK.EUICC.ECKA to the LPA. The LPA solicits the BPP (comprising the profile) to be downloaded from the eSIM server by sending a request message including the signed data object to the eSIM server. In some embodiments, the request message is a GetBoundProfilePackage message defined for the ES9 interface of SGP.22. Some additional SGP.22 messages with their respective interfaces are i) GetProfileInstallationResult (interface ES10b), ii) GetEUICCChallenge (interface ES10b), and iii) GetEUICCInfo (interface ES10c).

The eSIM server recognizes the transaction identifier in the request message and sends the BPP to the LPA. The LPA stores, also referred to as the LPA persists, the BPP. The LPA initializes a retry counter to zero at this point, in some embodiments. Also, the LPA creates an entry in an LPA state table. The entry includes the transaction identifier, and in some embodiments, a memory location at which the BPP is stored in the device and a Boolean value indicating whether successful installation of the corresponding profile has been confirmed by the eUICC.

The LPA commences to convey portions of the BPP to the eUICC using a loading command or a series of loading commands. The eUICC adds otPK.DP.ECKA and the ICCID value of the reserved profile (eSIM) to the session entry of the download state table when the information is available. For example, in SGP.22, conveying portions of the BPP to an eUICC is done using a loading command known as LoadBoundProfilePackage (interface ES10b). After receiving a first loading command, the eUICC, in some embodiments, calculates a session key. An example of a session key is S-ENC of SGP.22. S-ENC, in some embodiments, is based on otPK.DP.ECKA and otSK.EUICC.ECKA.

In some instances, an error event can occur during profile download from the eSIM server or during loading of the BPP from the LPA to the eUICC. The eUICC recognizes the error event, generates a notification with a sequence number and reports the error event when polled, using the notification, to the LPA. The sequence number is maintained as state information by the eUICC. In some embodiments, the eUICC categorizes the error event as a permanent failure or as a temporary failure. A permanent failure is also referred to herein as a substantial failure. Examples of temporary failures are: i) insufficient memory in the eUICC for the profile, and ii) failure due to interruption.

A substantial failure can be, for example: related to a flaw in the BPP, invalid input values in the loading command, invalid signature in the loading command, unsupported CRT (control reference template) values, an unsupported remote operation type, the BPP contains a profile of an unsupported profile class, invalid scp03t structure or security error, the ICCID of the profile in the BPP is associated with a profile already present on the eUICC, a profile element processing error, the ICCID of the profile in the BPP does not match with the expected ICCID value, and/or failure due to an invalid network access application (NAA) key.

In the case of a substantial failure, re-commencement of the profile download using the BPP stored in the device may not succeed. Thus, in the case of a substantial failure, the LPA will report the failure to the eSIM server with an error code, and the eSIM server will initiate a corrective action.

In the case of a temporary failure, the LPA and the eUICC work together, in some embodiments, to recover from the temporary failure. In some embodiments, the LPA queries the eUICC to determine one or more of the download session entries in the download state table. This query assists the LPA in case of a power failure in the device causing the LPA to be uncertain of whether a profile installation has completed.

In some embodiments, before attempting a retry, the LPA resets the eUICC to achieve a fresh operating state in the operating system of the eUICC.

Depending on the error code, the LPA may request that the end user assist in the corrective action. For example, if the eUICC does not have sufficient non-volatile memory to store the profile being downloaded, in some embodiments the LPA prompts the user to delete any unused profiles (eSIMs) already installed on the eUICC.

Before attempting a retry (also referred to as a renewed installation attempt), the LPA increments the retry counter in some embodiments, and then compares the retry counter to a retry threshold value. In some embodiments, the retry threshold value is an integer value such as three. The retry threshold value in the LPA can be configurable so that, for example, the end user, an MNO, or the device manufacturer, can adjust the threshold value.

If the retry counter exceeds the retry threshold value, the LPA does not attempt to download the stored BPP to the eUICC, but may, for example, forward a notification indicating the installation failure to the eSIM server and await a command from the eSIM server.

If the retry counter does not exceed the retry threshold value and the error code is categorized as a temporary failure, the LPA performs corrective action to achieve a successful profile loading into the eUICC without involving the eSIM server in the retry attempt. If the reported failure indicates that the eUICC is out of RAM memory (volatile memory), the LPA, in some embodiments, resets the eUICC. In some embodiments, the LPA sends a portion of the persisted (saved) BPP to the eUICC in a second loading attempt.

In some instances, the second loading attempt proceeds with no second error event; i.e., the profile is successfully installed from the BPP into the eUICC on the second attempt. The eUICC generates a notification of this successful loading event, and associates this notification with an incremented sequence number (incremented from the value associated with the notification of the error event). The sequence number tells the LPA which notification is the most recent.

The LPA, in some embodiments, solicits notifications from the eUICC after completing the BPP loading. This can be done with a request message. An example of such a request message for this purpose is a ListNotification message. The eUICC provides the first and second notifications with respective sequence numbers to the LPA. In some embodiments, the LPA then forwards the first and second notifications to the eSIM server and the eSIM server responds with messages, via the LPA, indicating that the notifications are to be deleted from the eUICC. In some embodiments, the LPA only sends the second notification to the eSIM server, because the information in the first notification has been made stale by the successful loading on the second profile loading attempt.

An overview of device and eUICC methods is presented next.

Device Method Overview

A method for installing an eSIM on an eUICC includes a device receiving, from an eSIM server, a BPP comprising the eSIM in an encrypted form; sending a first portion of the BPP to the eUICC at a first time, wherein the eUICC is housed in the device; receiving a failure code from the eUICC, wherein the failure code indicates a fault in processing the BPP; and determining whether an installation of the eSIM may be re-started without the eSIM server, wherein the determining categorizes the failure code. In some embodiments, the device sends the first portion of the BPP to the eUICC at a second time as part of a renewed installation attempt when the failure code is categorized as a temporary error. However, in response to determining that the failure code corresponds to a substantial error, the device, in some embodiments sends a notification to the eSIM server, wherein the notification is based on the fault.

In some embodiments, the determining includes evaluating a level of a retry counter; and when the level of the retry counter exceeds a retry threshold categorizing the failure code as corresponding to a substantial error. In some embodiments, the method includes saving, subsequent to the receiving the BPP, the BPP in a non-volatile memory (NVM) of the device. In some embodiments, the method includes creating, subsequent to the receiving the BPP, an entry in an LPA state table, wherein: i) the entry comprises a transaction identifier assigned by the eSIM server, ii) the transaction identifier is associated with the installation of the eSIM, and iii) the LPA state table is stored in the NVM. In some embodiments, the method includes performing, subsequent to the receiving the failure code, a corrective action. The corrective action may include: i) prompting an end user of the device to free memory in the eUICC; ii) sending a reset signal to the eUICC to restart an operating system of the eUICC; iii) sending a query to the eUICC; and/or iv) recovery of a temporary device error. Examples of recovery from a temporary device error include resetting a baseband processor and/or rebooting the device.

In some embodiments, the prompting comprises prompting the end user to delete an unused eSIM from the eUICC. In some embodiments, the query prompts the eUICC to provide eUICC state information related to the installation of the eSIM. In some embodiments, the reset signal causes a reset of a volatile memory (RAM) in the eUICC and/or the reset signal causes an operating system fault of an operating system of the eUICC to be corrected. In some embodiments, the method includes sending, subsequent to the second time, one or more additional portions of the BPP to the eUICC; receiving, from the eUICC, a success code; soliciting, from the eUICC, one or more notifications; and sending a second notification to the eSIM server, wherein the second notification indicates that the eSIM installation has been completed successfully.

eUICC Method Overview

A method for installing an eSIM on an eUICC includes the eUICC receiving, from a device, one or more portions of a BPP, wherein: i) the BPP comprises the eSIM in an encrypted form, ii) the eUICC is housed in the device, and iii) the one or more portions comprise a first portion received at a first time; creating an entry in a download state table, wherein: i) the entry comprises an identifier related to the BPP, and ii) the transaction identifier is associated by an eSIM server with an installation of the eSIM in the eUICC; detecting an error event, wherein the error event is associated with processing the one or more portions; and sending a failure code to the device, wherein the failure code is based on the error event. In some embodiments, the identifier related to the BPP is a transaction identifier assigned by the eSIM server and the transaction identifier is associated with the installation of the eSIM. In some embodiments, the transaction identifier is the ICCID value of the eSIM to be installed.

In some embodiments, the entry in the download state table of the eUICC method includes: i) an identifier of the eSIM, ii) an identifier of the eSIM server, ii) a first Boolean entry, wherein an asserted value of the first Boolean entry indicates that the eSIM installation has started, iii) a second Boolean entry, wherein an asserted value of the second Boolean entry indicates that the eSIM installation has completed, and/or iv) a cryptographic signature value. In some embodiments, the cryptographic signature value is an SGP.22 euiccSignature1 value. In some embodiments, the entry in the download state table of the eUICC method includes (in addition or in the alternative): i) a one-time public key of the eSIM server, wherein the one-time public key of the eSIM server is associated with the transaction identifier, ii) a one-time public key of the eUICC; and/or iii) a one-time private key corresponding to the one-time public key of the eUICC, wherein the one-time public key of the eUICC is associated with the transaction identifier.

In some embodiments, the method for installing an eSIM on an eUICC includes receiving, during a renewed installation attempt of the eSIM in the eUICC, the first portion at a second time later than the first time. In some embodiments, the method includes receiving, during the renewed installation attempt, a last portion of the BPP at a third time later than the second time; computing, during the renewed installation attempt, a recomputed session key based on: i) the one-time public key of the eSIM server, and ii) the one-time private key of the eUICC; deciphering the last portion of the BPP using the recomputed session key to produce a deciphered last portion; using the deciphered last portion to complete an installation of the eSIM in the eUICC; and sending a success code to the eUICC based on a successful installation of the eSIM in the eUICC. In some embodiments, the last portion is the last of three or more portions of the BPP needed for the successful installation of the eSIM in the eUICC.

In some instances, an error occurs before the BPP download phase begins. In some embodiments, the eUICC method for installing an eSIM in an eUICC includes receiving, from a device, session data; creating an entry in a download state table, wherein the entry comprises the session data; receiving, from a device, a download preparation message; detecting an error event, wherein the error event is associated with the download preparation message; sending a failure code to the device, wherein the failure code is based on the error event; receiving a second download preparation message; retrieving the session data; and verifying the second download preparation message based on the session data and based on the second download preparation message. In some embodiments, the session data comprises a cryptographic signature value.

Some Details

Details of conventional eSIM server, LPA, and eUICC functions and message types as well as conventional profile processing can be found in SGP.22. Some information related to eSIM provisioning, devices, eUICCs, PKI techniques, and elliptic curve cryptography is provided here.

eSIM Provisioning

A function which provides BPPs is known as a subscription manager data preparation (SM-DP, or SM-DP+). An SM-DP may also be referred to as a profile provider, an eSIM server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The eSIM server communicates over an interface with an eUICC. Certificates used for authentication and confidentiality purposes can be generated by a trusted certificate issuer.

Device Description

In some embodiments, a device includes an LPA, which includes functions grouped as local profile download (LPD) functions. The LPA communicates with the end user of the device via the user interface of the device. LPA provides services including transfer of a profile package from the device to an issuer security domain—profile (ISD-P) of an eUICC hosted by the device, listing of installed profiles in the eUICC, retrieval of an identifier of the eUICC (EID), and local profile management operations. More information on conventional LPA functions can be found in SGP.22.

eUICC Description

An eUICC includes an operating system, and the operating system can include ability to provide authentication algorithms to network access applications associated with a given operator. The operating system also can include the ability to translate profile package data into an installed profile using a specific internal format of the eUICC. An ISD-P can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ISD-R (issuer security domain—root) is a function in a eUICC responsible for the creation of new ISD-Ps on the eUICC. An ECASD (eUICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

Some activities related to an eUICC resident in a device may be performed by the device. Examples of such activities are profile download assistance and local user interface functions. More information on profile download assistance and local user interface functions can be found in SGP.22.

Public Key Infrastructure Techniques

Communications of an eUICC may be authenticated using PKI techniques. The techniques disclosed herein are applicable to eUICCs, UICCs, and SEs. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

Elliptic Curve Cryptography Key Agreement (ECKA)

An eUICC can generate a one-time public key otP-K.eUICC.ECKA and an eSIM server can generate a one-time public key otPK.DP.ECKA (with their respective one time private keys otSK.[eUICC or DP].ECKA) to create an input for a Key Derivation process to create a session key for encryption, S-ENC. More details of key derivation can be found in SGP.22. In some embodiments, RSA techniques are used in the alternative or in addition to elliptic curve techniques.

System

FIG. 1A illustrates an exemplary system 100 for recovering from an error event while an eSIM server 130 is provisioning an eUICC 101. The eUICC 101 is in a device 105 used by an end user 120. The device 105 includes a user interface 103 and an LPD function 102, which is a part of an LPA 104. Software for operating LPD 102, LPA 104, and user interface 103 is supported by the device operating system, not shown. The eSIM server 130 communicates with the device 105 via an interface 131, also referred to as an ES8 interface. The ES8 interface is realized by interface 132 (also called ES9) and interface 112 (also called ES10). LPA 104 also makes use of user interface 103. The end user 120 communicates with the user interface 103 via interface 121 and the user interface 103 communicates with the eUICC 101 via interface 113. FIG. 1A illustrates a successfully installed eSIM 106; the goal of the profile installation flows described herein is directed to this installation of the eSIM 106 in the eUICC 101.

Figure 8A:
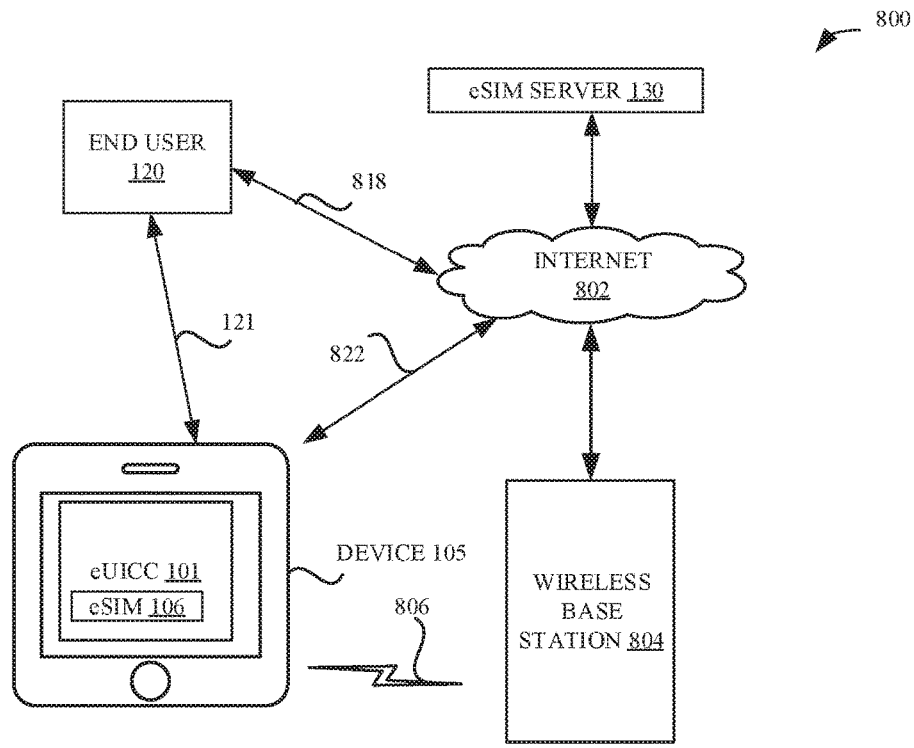
FIG. 8A illustrates an exemplary communication and provisioning system, according to some embodiments.
Figure 8B:
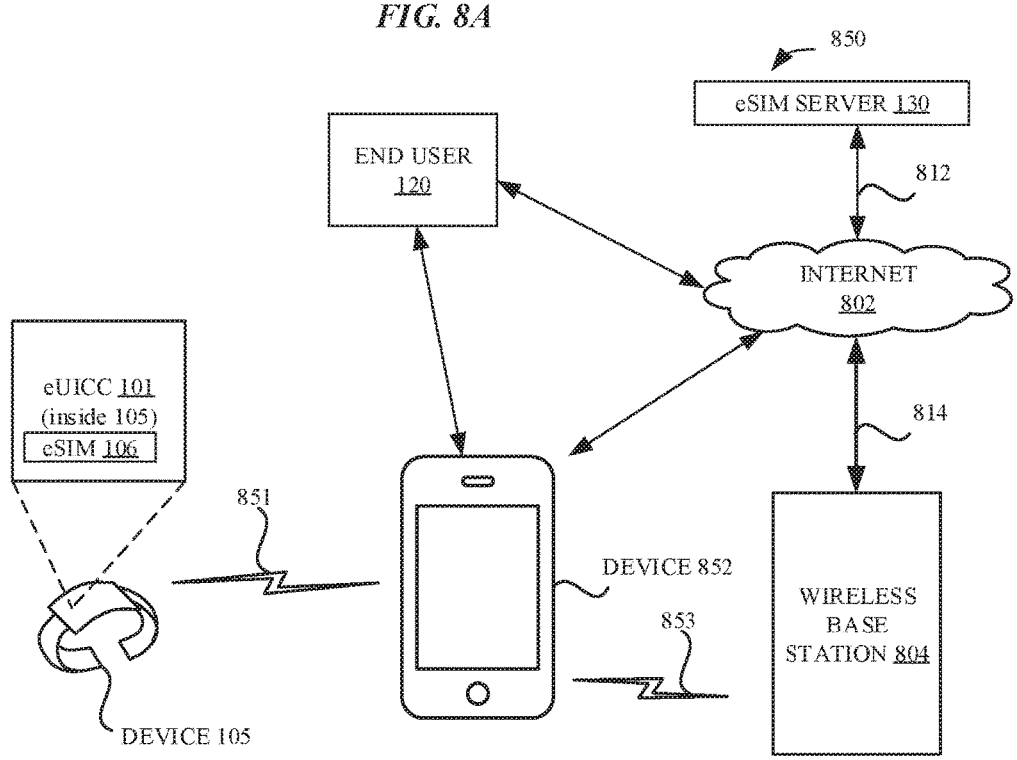
FIG. 8B illustrates an exemplary communication and provisioning system similar to that shown in FIG. 8A.

In some embodiments, the device 105 housing the eUICC 101 is an accessory device; communications with the end user 120 and the eSIM server 130 are relayed to the device 105 via a primary device 852 (see FIG. 8B).

State Diagram

FIG. 1B illustrates a state diagram 150 of activities and states related to error recovery from an error event during a provisioning call flow, according to some embodiments. The state diagram 150 is schematic in nature for clear presentation of events. At state 151, possibly based on input from the end user 120, the device 105 initiates a profile download. After authentication and information exchange (not shown), activities then flow via transition 161 to state 152 in which a BPP is downloaded from the eSIM server 130 to the device 105 (represented by LPA 104 in FIG. 1B). The activities then flow by 162 to state 153. The LPA 104 then works with the eUICC 101 in state 153 ("Load to eUICC") to install the eSIM 106. In an error-free case, the next transition is 166 to success state 156. An error event is represented by the transition 163 to the error event state 154. Embodiments described herein provide the transition 164 to the local recovery state 155. After the local recovery state 155, a second attempt at installation of the eSIM 106 (a renewed installation attempt) in the eUICC 101 is represented by the entry of the transition 165 into the state 153. If there is no error on the second attempt, the system state will evolve via the transition 166 to the success state 156.

Error event state 154 represents instances in which an error occurs during the eSIM installation flow. Errors, in some instances, are reported on the ES9 and ES10 interfaces. Some additional error event scenarios are as follows. There could be a communication failure between the LPA and the eSIM server 130. End user 120 might remove the eUICC 101, if it is a removable eUICC card. End user 120 might remove a battery from the device 105 or switch off the power during the eSIM installation flow. A software failure could crash one or more processors or functions in the device 105. The eUICC might run out of non-volatile memory in which to install the eSIM 106, or the eUICC might run out of volatile memory (RAM) used during the installation. Another error event is a faulty eUICC OS state.

Embodiments described herein mitigate the trouble caused by these error events. Local recovery state 155 can include, after determining that the nature of the error is temporary, resetting the eUICC 101 operating system, asking the end user 120 to free non-volatile memory space by deleting eSIMs, and/or renewing download of a BPP stored in the device after a power loss at the device or the eUICC.

Provisioning Phases

FIG. 2A illustrates provisioning (or eSIM installation) phases. A time axis is shown at the left, with time advancing from top to bottom. Entity names are provided across the top, each name associated with a vertical line representing the entity at the point in time of the timeline on the left. An MNO server 201 is introduced in FIG. 2A; the other entities were introduced in FIG. 1A. FIG. 2A illustrates the phases using boxes which span the entity timelines. For example, the box "Initiation Phase 210" spans the end user 120, the MNO server 201, the eSIM server 130 and the LPA 104. This means that each of these entities sends or receives a message, or performs or experiences an event during the initiation phase 210. The phases of FIG. 2A have been described above in the section "Local Recovery of eSIM Installation Flow." The initiation phase 210 is followed by: i) the authentication and information exchange phase 220, ii) the download transition phase 230, and iii) the eSIM server download phase 240. The next several phases are denoted local phases 255, i.e., they are confined to the LPA 104 and the eUICC 101. The local phases include the eUICC loading phase 250, the error event phase 260, the local recovery phase 270, and the eUICC loading phase 280. Further details of local phases 255 in terms of messages and events are given in FIG. 6. The eUICC loading phase 280 is followed by the reporting phase 290, which involves the eSIM server 130.

Figure 2B:
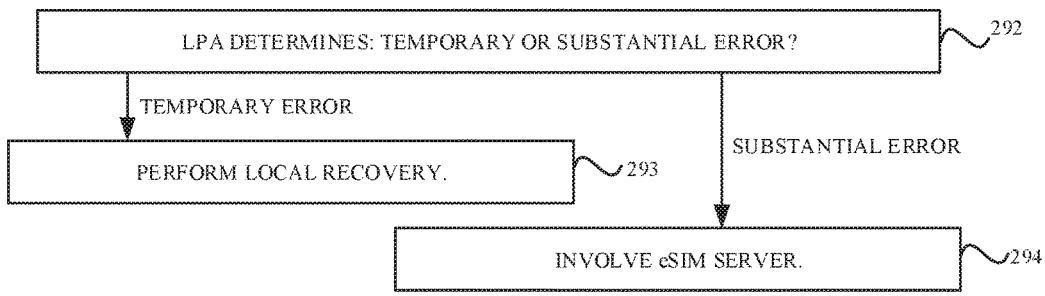
FIG. 2B illustrates an exemplary categorization of an error event, according to some embodiments.

FIG. 2B provides exemplary logic 291 performed by the LPA 104. After the error event phase 260, the LPA 104 determines the nature of the error; this is shown at 292. If the error event is a temporary error, the logic flows to 293 and the LPA sets on a course of recovery without involving the eSIM server 130. If the error event corresponds to a substantial error, the LPA 104 decides that the eSIM server 130 is required to correct the error and/or to renew the profile installation process; in this case the logic flows to 294. Phase 270 of FIG. 2A, "Local Recovery Phase," corresponds to the temporary error/reference numeral 293 branch of FIG. 2B. The substantial error/reference numeral 294 branch of FIG. 2B is not illustrated in FIG. 2A.

LPA Logic

Figure 3:
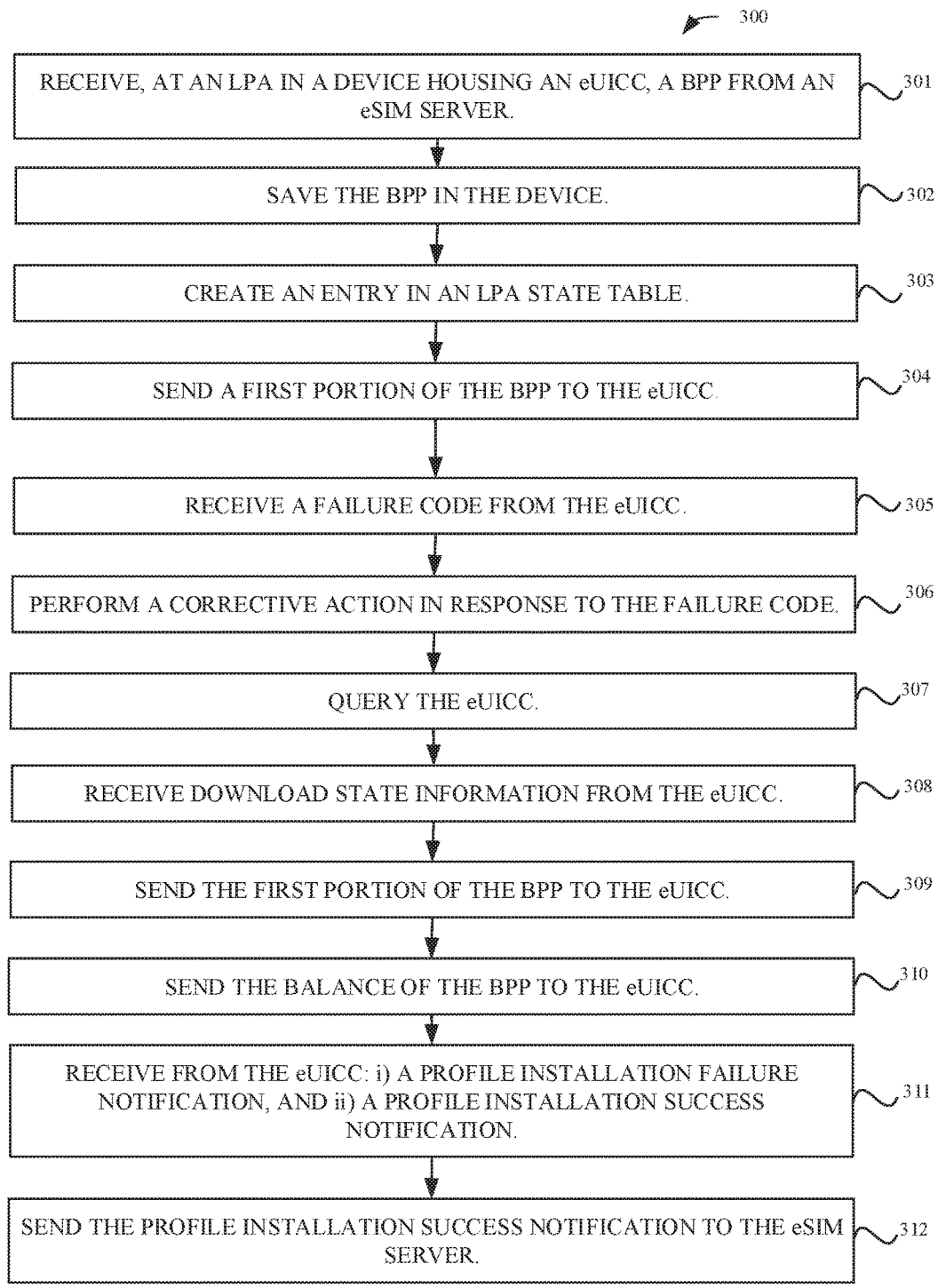
FIG. 3 illustrates exemplary logic of an LPA performing local recovery, according to some embodiments. Local recovery is a form of a renewed installation attempt.

FIG. 3 illustrates exemplary LPA logic 300 for performing local error recovery of an eSIM installation flow. The LPA is a role performed in a device, and an SE, such as an eUICC, is hosted by the device. At 301, an LPA receives from an eSIM server a BPP containing an encrypted profile, and the profile is to be installed in the eUICC. At 302, the LPA saves, or persists, the BPP in the device. At 303, the LPA creates an entry in an LPA state table. The entry includes a transaction identifier assigned by the eSIM server to the transaction of the profile installation in the eUICC. At 304, the LPA sends a first portion of the BPP to the eUICC.

At 305, the LPA receives an error code from the eUICC. In general, one or more portions of the BPP may be sent to the eUICC before reaching the logic of 305 announcing an error code. At 306, 307, 308, the LPA logic performs a corrective action and obtains information. In some embodiments, 306-308 include one or more of the following: i) ask the end user of the device to delete unneeded eSIMs from the eUICC, ii) reset the OS of the eUICC by resetting the eUICC, iii) send a query to the eUICC (307) to determine profile installation state information stored in the eUICC and receive the eUICC response (308).

In the exemplary logic 300, the LPA determines that the failure code of 305 can be recovered from locally. The logic flow proceeds to 309 and the LPA again sends the first portion of the BPP to the eUICC. At 310, one or more additional portions of the BPP are sent to the eUICC until all of the information needed for profile installation by the eUICC has been transferred. The LPA requests notifications from the eUICC (not shown) and at 311 the LPA receives a first notification with a first sequence number corresponding to the installation failure related to 305. The LPA also receives a second notification with a second sequence number related to successful installation based on the BPP portions loaded into the eUICC at 309-310. In some embodiments, based on the sequence numbers, the LPA recognizes the first notification as being stale, and forwards, at 312, the second notification indicating profile installation success to the eSIM server. The logic of 305-311, including the failure code caused by an error event at 305 and the subsequent recovery of the profile installation flow, occurs without notice to, and without help from, the eSIM server.

eUICC Logic

Figure 4:
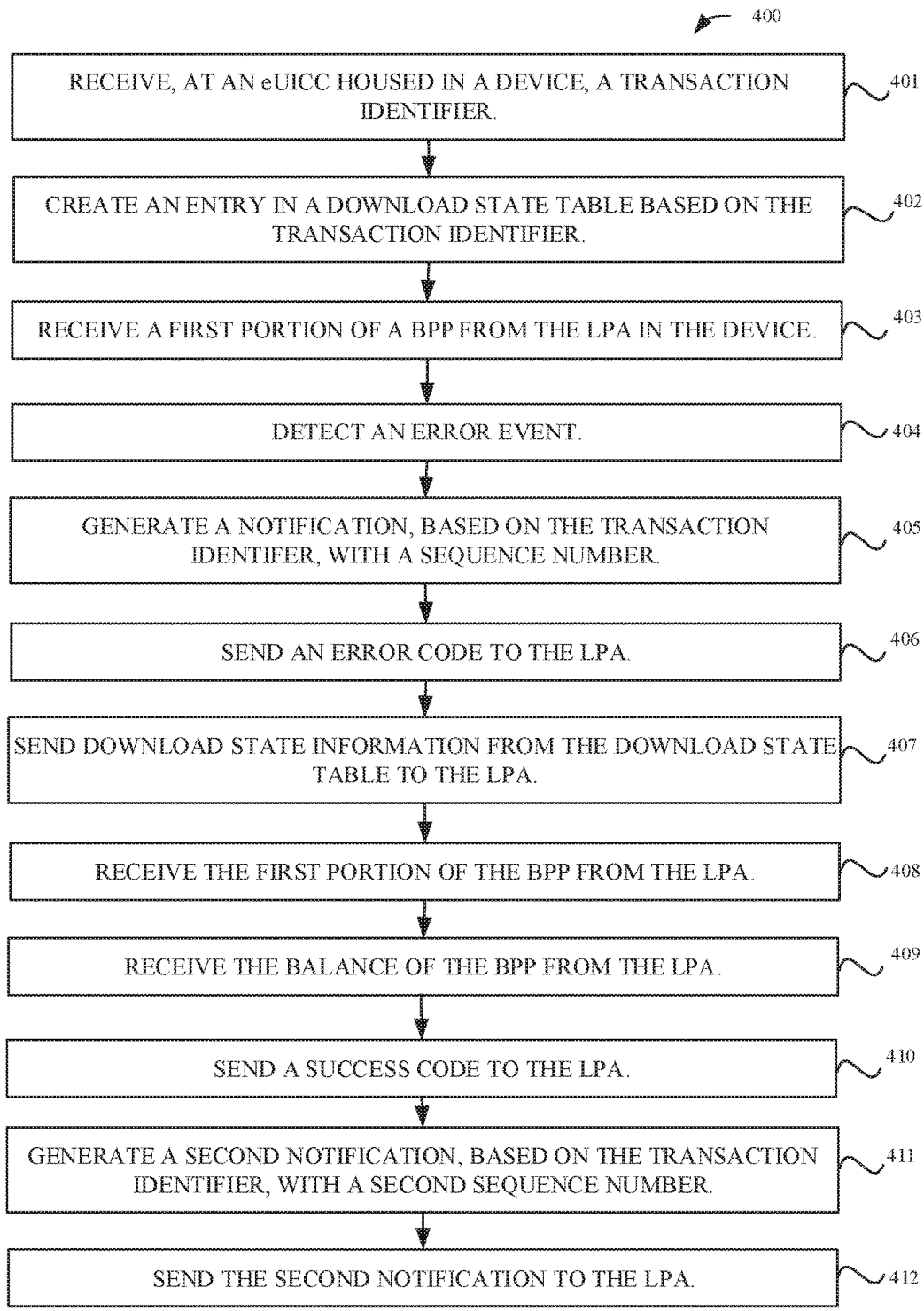
FIG. 4 illustrates exemplary logic performed by an eUICC during a local recovery, according to some embodiments.

FIG. 4 illustrates exemplary eUICC logic 400 for local recovery of an eSIM installation flow. The eUICC logic of FIG. 4 represents events and messages related to those described in the LPA logic of FIG. 3 with respect to the LPA, a device, and an eUICC in the device. At 401, the eUICC receives a transaction identifier related to eSIM installation. At 402, the eUICC creates an entry in a download state table based on the transaction identifier. At 403, the eUICC receives from the LPA a first portion of a BPP associated with the transaction identifier. At 404, the eUICC detects an error event associated with the eSIM installation. One or more portions of the BPP may arrive at the eUICC between 403 and 404 (not shown). At 405, the eUICC generates a notification for the eSIM server with a sequence number; the notification includes the transaction identifier. At 406, the eUICC sends an error code related to the error event to the LPA. At 407, the eUICC sends download state information associated with the transaction identifier to the LPA. The LPA performs corrective actions as needed. At 408, the eUICC again receives the first portion of the BPP as part of a renewed installation attempt. In some embodiments, the eUICC recomputes a session key (S-ENC) based on entries in the download state table. At 409, the eUICC receives the balance of the BPP as needed for installation of the eSIM in the eUICC. At 410, the eUICC has determined that the eSIM has been successfully installed and sends a success code to the LPA. At 411, the eUICC generates a second notification associated with the transaction identifier; the second notification is associated with a second sequence number higher than the first sequence number. At 412, the eUICC sends the second notification to the LPA. After the LPA forwards the second notification to the LPA, the eUICC will receive a command to delete the second notification.

Presented herein is an exemplary method by an eUICC in agreement with logic 400 for installing an eSIM in an eUICC. The method includes receiving, from a device, one or more portions of a BPP, wherein: i) the BPP comprises the eSIM in an encrypted form, ii) the eUICC is housed in the device, and iii) the one or more portions comprise a first portion received at a first time. The method also includes creating an entry in a download state table, wherein: i) the entry comprises a transaction identifier, and an eSIM server identifier, and iii) the transaction identifier is associated by the eSIM server with an installation of the eSIM in the eUICC. In addition, the method includes detecting an error event, wherein the error event is associated with processing the one or more portions and sending a failure code to the device, wherein the failure code is based on the error event.

In some embodiments, the method also includes performing, before the receiving one or more portions, authentication with the eSIM server using a cryptographic technique. In some embodiments, the cryptographic technique is an elliptic curve technique. In some other embodiments, the cryptographic technique is an RSA technique. In some embodiments, the entry in the download state table includes an identifier of the eSIM. In some embodiments, the entry in the download state table includes a first Boolean entry, wherein a first assertion of the first Boolean entry indicates that the eSIM installation has started; and a second Boolean entry, wherein a second assertion of the second Boolean entry indicates that the eSIM installation has completed. In some embodiments, the entry in the download state table includes a cryptographic signature value. In some embodiments, the entry in the download state table includes a one-time public key of the eSIM server, wherein the one-time public key of the eSIM server is associated with the transaction identifier. In some embodiments, the entry in the download state table includes a one-time public key of the eUICC; and a one-time private key corresponding to the one-time public key of the eUICC, wherein the one-time public key of the eUICC is associated with the transaction identifier.

The method also includes, in some embodiments, receiving, during a renewed installation attempt of the eSIM in the eUICC, the first portion of the BPP at a second time later than the first time.

In some embodiments, the method also includes receiving, during the renewed installation attempt, a last portion of the BPP at a third time later than the second time; computing, during the renewed installation attempt, a recomputed session key based on: i) the one-time public key of the eSIM server, and ii) the one-time private key of the eUICC; deciphering the last portion of the BPP using the recomputed session key to produce a deciphered last portion; using the deciphered last portion to complete an installation of the eSIM in the eUICC; and sending a success code to the eUICC based on a successful installation of the eSIM in the eUICC.

In some embodiments of the method, the last portion is the last of three or more portions of the BPP needed for the successful installation of the eSIM in the eUICC.

Method when Error Occurs During PrepareDownload

In an alternative method performed by an eUICC for installing an eSIM in the eUICC, the eUICC performs operations including receiving, from a device, session data, wherein the eUICC is housed in the device; creating an entry in a download state table, wherein the entry comprises the session data; receiving, from a device, a download preparation message; detecting an error event, wherein the error event is associated with the download preparation message; sending a failure code to the device, wherein the failure code is based on the error event; receiving a second download preparation message; and verifying the second download preparation message based on: i) the session data and ii) the second download preparation message. In some embodiments of the alternative method, the session data comprises a cryptographic signature value. In some embodiments, the download preparation message is a PrepareDownload message from the LPA to the eUICC and the cryptographic signature value is an euiccSignature1 value originally sent by the eUICC to the eSIM server and now returned to the eUICC by the LPA as the LPA provides to the eUICC the eSIM server response to a previous authentication request. Additional details of the PrepareDownload message and euiccSignature1 can be found in SGP.22.

eSIM Installation State Tables

Figure 5A:
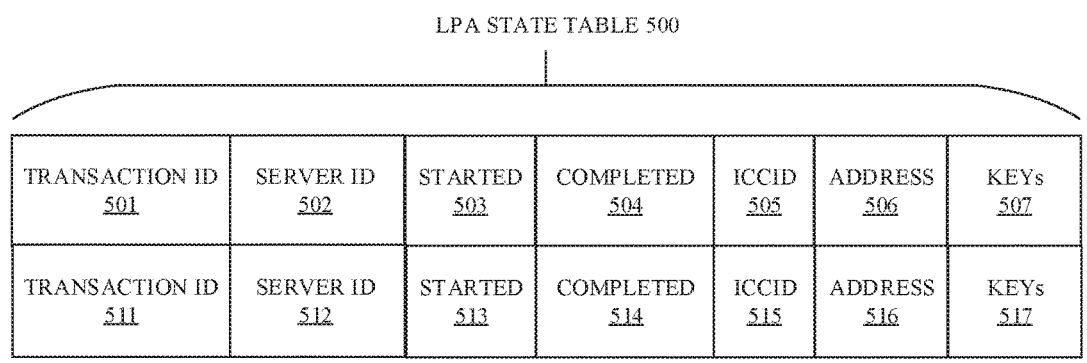
FIG. 5A illustrates exemplary LPA state information useful for performing local recovery, according to some embodiments.

FIG. 5A illustrates exemplary LPA state table 500. When the LPA 104 receives a download preparation message, such as for example a PrepareDownload message of SGP.22, the LPA creates a row in the LPA state table 500. The first column of the first row holds transaction ID 501, corresponding to an instance of the transaction identifier discussed herein. Transaction ID 501 is obtained by the LPA from the download preparation message. The LPA also populates the table with an identifier of the eSIM server 130, for example an OID value. The eSIM server identifier value is denoted server ID 502 in FIG. 5A. The Boolean fields started 503 and completed 504 indicate, respectively, whether the eSIM installation identified by transaction ID 501 has started and successfully completed. ICCID 505 is the identifier of the eSIM, if the LPA knows it. Address 506 is a location of the saved BPP in the device 105 memory so that the BPP can be retrieved if needed for a renewed installation attempt.

Keys 507 represent table memory allocation for otPK.DP.ECKA and/or otPK.EUICC.ECKA. The values in keys 507 permit the LPA 104 to know if the BPP saved at address 506 can be accepted by the eUICC 101. For example, in some embodiments, the LPA 104 solicits with a query (see, for example, FIG. 3 reference numeral 307) eUICC download state table session entries. In some embodiments, when both otPK.DP.ECKA and otPK.EUICC.ECKA of keys 507 match instances of the same variable names returned by the eUICC (see keys 525 of FIG. 5B), then the LPA 104 knows that the BPP can be decrypted by the eUICC 101. In some embodiments, the keys-check is not performed and if the transaction ID 501 associated with the BPP stored at address 506 matches the transaction ID 521 returned by the eUICC 101 in response to a query, then the BPP at the address 506, in some embodiments, is deemed proper and decipherable by the eUICC. The second row of the table holds second instances of the same variable types. In particular, the second row of the LPA State 500 holds values transaction ID 511, server ID, 512, started 513, completed 514, ICCID 515, address 516, and keys 517. After the table reaches a configurable limit-number of rows, the LPA, in some embodiments, deletes the oldest row and corresponding persisted BPP. Each row may be referred to as corresponding to a remote SIM provisioning (RSP) session.

In some instances, an error occurs during transmission or reception of the PrepareDownload message on the ES10b interface. In some embodiments, the LPA state table 500 is created by the LPA 104 during the download transition phase 230 and includes a Boolean entry indicating whether the eUICC 101 has confirmed successful reception of the PrepareDownload message during the download transition phase 230. In some embodiments, the LPA 104 resends the PrepareDownload message after a PrepareDownload message error without restarting the eSIM installation flow and without notifying the eSIM server 130 of the PrepareDownload message error.

Figure 5B:
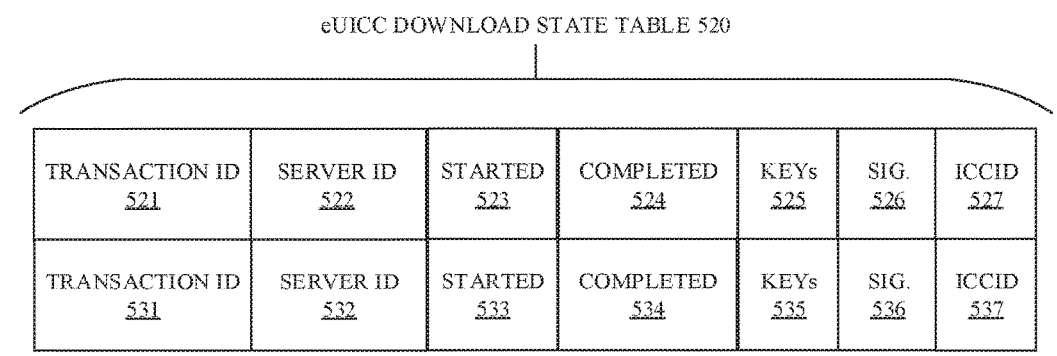
FIG. 5B illustrates exemplary eUICC state information useful for performing local recovery, according to some embodiments.

FIG. 5B illustrates exemplary eUICC download state table 520. The fields transaction ID 521, server ID 522, started 523, completed 524, and ICCID 527 correspond to the entries with the same names (reference numerals 501, 502, 503, 504, and 505) in FIG. 5A. The two tables are not always synchronized. Synchronization, in some embodiments, is achieved by the LPA query/response of FIG. 3 reference numerals 307-308 (also see reference numeral 407 of FIG. 4.).

FIG. 5B also illustrates state information keys 525 and sig. (signature) 526. The keys 525 table entry, in some embodiments, provides storage for one or more of the following three cryptographic keys: i) otPK.DP.ECKA, ii) otPK.eUICC.ECKA, and/or iii) otSK.eUICC.ECKA. The sig. 526 table entry provides storage for the cryptographic signature value euiccSignature1. S-ENC, used in profile installation, is derived based on otPK.DP.ECKA and otSK.eUICC.ECKA. FIG. 5B also illustrates a second row; the second row corresponds to an eSIM installation distinct from the first row. The elements of the second row are transaction ID 531, server ID 532, started 533, completed 534, keys 535, sig. 536, and ICCID 537.

Local Recovery Message Flow

Figure 6:
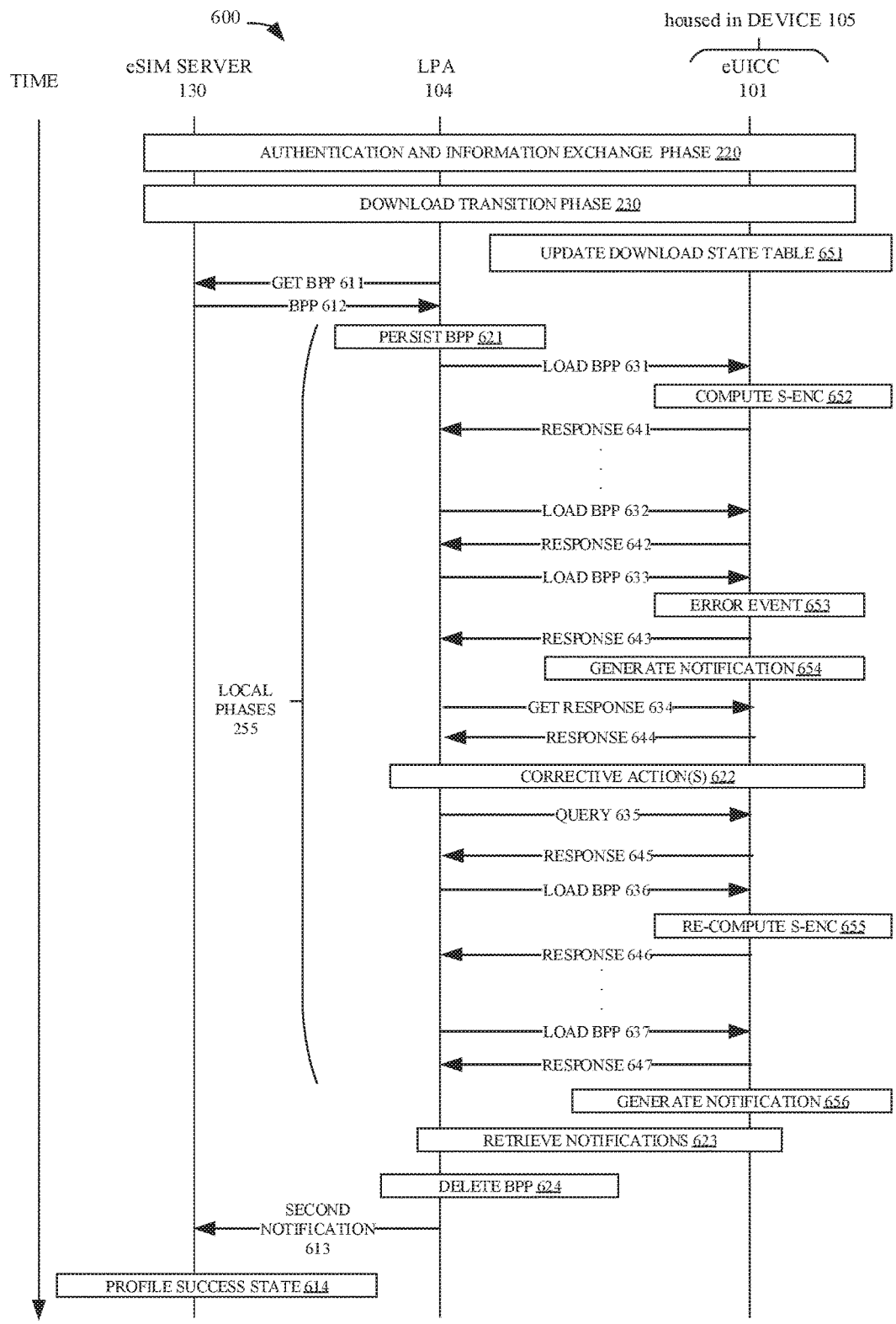
FIG. 6 illustrates exemplary message sequences pertaining to local recovery, according to some embodiments.

FIG. 6 illustrates exemplary message flow 600 for local recovery of an eSIM installation flow. The entities eSIM server 130, LPA 104, and the eUICC 101 are represented across the top of the figure. Time advances from top to bottom. Phases 220 (authentication/information) and 230 (download transition) from FIG. 2A are illustrated again in FIG. 6 to provide context. Phase 200, in some embodiments, includes an AuthenticateServer message on the interface 112 (ES10b of SGP.22) from the LPA 104 to the eUICC 101 followed by an AuthenticateClient message on the interface 132 (ES9+ of SGP.22) from the LPA 104 to the eSIM server 130. After the download transition phase 230: i) the eUICC 101 updates the download state table 651 and ii) the LPA 104 sends a get BPP message 611 to the eSIM Server 130. Further details of the download state table are provided in FIG. 5B. The eSIM server 130 provides the BPP 612 (including an encrypted version of the eSIM 106) to the LPA 104. The local phases 255 then commence.

The LPA 104 stores the BPP in case of an error event ("persist BPP 621" in FIG. 6). The LPA 104 and the eUICC 101 then begin a series of load (631, . . . , 632, 633) and response (641, . . . , 642, 643) messages where the LPA 104 provides succeeding portions of the BPP and the eUICC 101 responds with indications. In the example of FIG. 6 response 641 through response 642 indicate successful processing. After the load BPP 631 message, the eUICC 101 derives one time session keys such as S-ENC needed for deciphering the portions of the BPP loaded into the eUICC by the LPA 104 (shown at 652). After the message load BPP 633, the eUICC 101 detects error event 653. Response 643 indicates an error code to the LPA 104. The eUICC 101 then performs the function "generate notification 654" with the transaction identifier assigned by the eSIM server 130 for this eSIM installation and a sequence number maintained by the eUICC 101. In this case, for example, the sequence number may be a first number, such as 1.

After receiving the error code, the LPA 104 sends a get response 634 message and the eUICC 101 sends the notification in the response 644. The LPA 104, in some embodiments, then performs corrective actions 622 using the logic of FIG. 2 reference numerals 292 and 293 followed by the logic of FIG. 3, reference numerals 306-308. For example, the error event 653 is categorized by the LPA 104 as a temporary error which can be addressed locally.

After determining that the error event 653 represents a temporary error, in some embodiments, the LPA 104 takes corrective actions 622 such as: i) asking the end user 120 to delete unneeded eSIM profiles from the eUICC 101, ii) resetting the eUICC 101 to freshen the OS state or release RAM memory, and/or iii) verifying that the eUICC has state information needed to process (also referred to as unpack or replay) the BPP. This state information verification, in some embodiments, is performed using query 635 which elicits response 645. This query/response pair corresponds to the query 307 of the logic 300 and the download state information received at 308 of the logic 300.

In the case where the LPA 104 is satisfied that the eUICC 101 can process the BPP if it is loaded for a second time into the eUICC, the LPA 104 proceeds with the load BPP 636 message, which corresponds to again sending the eUICC 101 a first portion of the BPP. The eUICC 101 then, using information from the eUICC download state table 520, re-computes the session key S-ENC (see 655). A succession of load BPP messages 636 . . . 637 are confirmed by response messages 646 . . . 647 and the eSIM 106 is successfully installed in the eUICC 101.

After successful installation, the eUICC 101 generates a second notification with a second sequence number as indicated by generate notification 656. A message exchange is represented as the single box retrieve notifications 623. In retrieve notifications 633, the LPA 104 then solicits a list of notifications and then retrieves the notifications. In some embodiments, the LPA 104 deletes the BPP (marked as event 624) and marks the completed Boolean variable in the corresponding row of the LPA state table 500 with a value of TRUE. In some embodiments, the LPA 104 simply deletes the row corresponding to the installation of the eSIM 106.

After recovering the notifications, in some embodiments, the LPA 104 sends both notifications (not shown in FIG. 6) to the eSIM server 130 and the eSIM server 130 responds with messages commanding the eUICC 101 to delete the first and second notifications. In some embodiments, upon receiving notification that the eSIM 106 installation has failed, the eSIM Server 130 maintains a state variable indicating failed installation. In some embodiments, the LPA 104 only forwards the second notification indicating successful eSIM installation, see second notification 613. Upon learning, via the second notification, that the eSIM 106 been successfully installed in the eUICC 101, the eSIM server 130 updates the state variable to indicate successful installation (see profile success state 614).

In some embodiments, the device 105 housing the eUICC 101 is an accessory device; eUICC 101 communications shown in FIG. 6 with the LPA 104 and the eSIM server 130 are then relayed to the eUICC 101 via a primary device 852 (see FIG. 8B) and via the device 105.

eUICC Details

Figure 7:
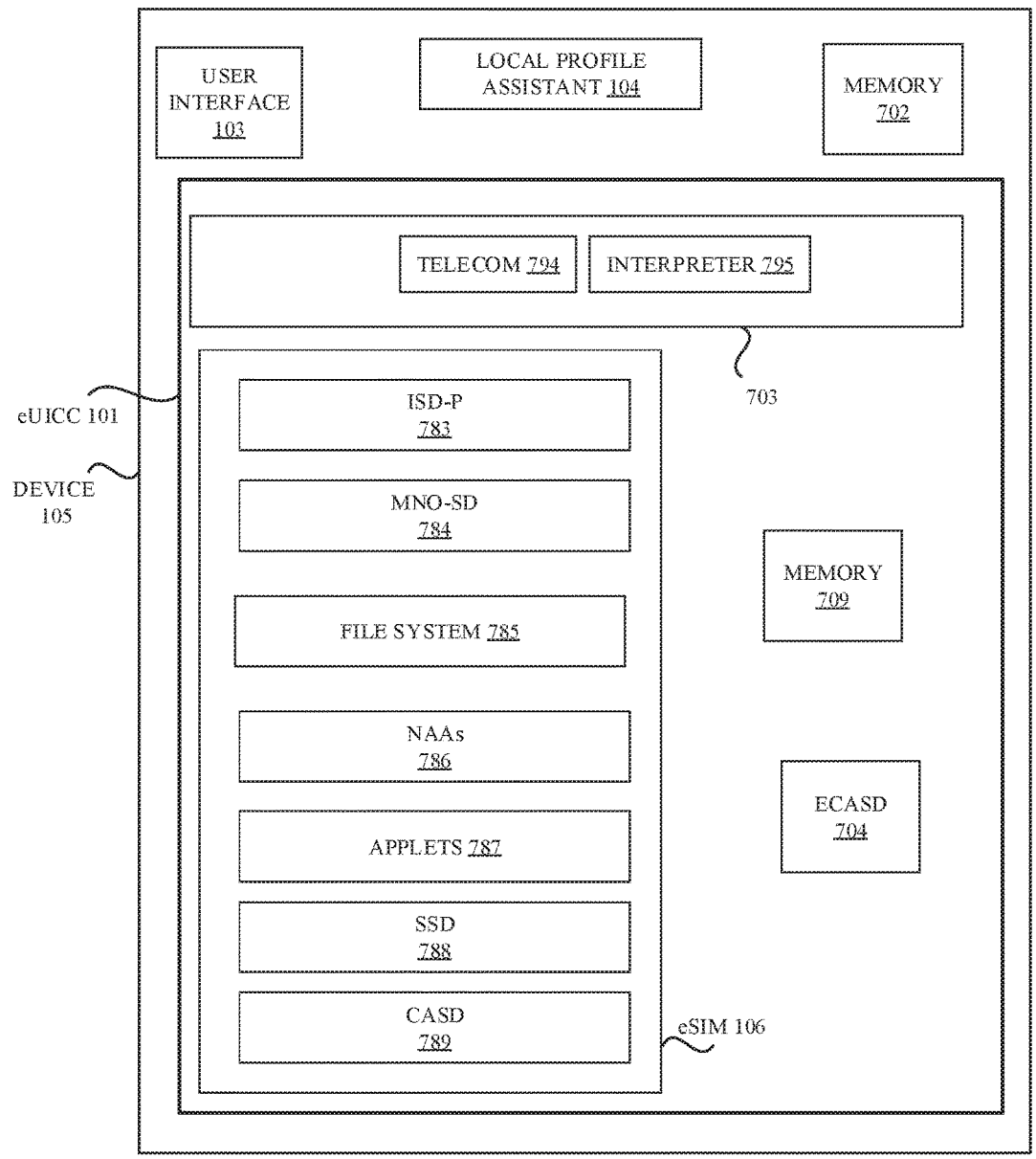
FIG. 7 illustrates an exemplary profile and other components described herein, according to some embodiments.

FIG. 7 illustrates a system 700 including the device 105 with memory 702, LPA 104, user interface 103 and eUICC 101. Also illustrated are details of the eUICC 101 including the eSIM 106. The eSIM is deployed as part of a BPP to the eUICC 101 via the device 105, for example, as illustrated in FIGS. 1A, 1B, 2A, 3, 4, and 6. The eUICC 101 includes an operating system 703 and a memory 709. Within the operating system 703 is a telecom framework 794 which provides authentication algorithms to network access applications (such as NAAs 786). Interpreter 795 translates profile package data into an installed profile using a specific internal format of the eUICC 101. ISD-P 783 hosts the eSIM 106. The ISD-P is a secure container (security domain) for the hosting of the eSIM 106. The ISD-P is used for eSIM download and installation in collaboration with the interpreter 795 for the decoding of the BPP.

An ISD-R (not shown) on the eUICC 101 is responsible for the creation of new ISD-Ps on the eUICC 101 and the lifecycle management of all ISD-Ps on the eUICC 101. ECASD 704 provides secure storage of credentials required to support the security domains on eUICC 101. The various keys described herein, for example, otPK.EUICC and/or S-ENC, are stored in the ISD-R, in some embodiments. In some embodiments, the eUICC download state table 520 described herein is stored in the ECASD 704 and/or the memory 709. MNO-SD 784 is the representative on the eUICC 101 of the operator providing services via the eSIM 106 to the end user 120. The MNO-SD 784 contains the operator's OTA keys and provides a secure OTA channel, for example, to the MNO server 201. The eSIM 106 will generally include a file system 785, applets 787, a controlling authority security domain (CASD) 789, and may contain a supplemental security domain 788.

Example Device Connections

FIG. 8A illustrates example connection methods for recovery from an error event during an eSIM installation flow in a system 800. End user 120 can manage device 105 using interface 121 which can convey end user actions such as requesting a new carrier plan which can trigger the initiation phase 210. The end user 120 can also remotely manage device 105 via the Internet 802 using interface 818. The device 105 can connect to a wireless base station 804 via a wireless link 806 or to the Internet 802 via a wired connection 822. The wireless base station 804 can be an Institute of Electronic and Electrical Engineers 802.11 Wireless Fidelity (IEEE 802.11 Wi-Fi) access point (AP) or the wireless base station 804 can be, for example, a cellular mobile network base station. Examples of cellular mobile network base stations are a 2G or 3G base station or an LTE eNode B. After download and successful installation of the eSIM 106, the end user 120 can enjoy a requested carrier plan or a requested wireless service using the eSIM 106.

FIG. 8B illustrates example connection methods for recovery from an error event during an eSIM installation flow in a system 850. FIG. 8B includes like-numbered entities to those shown in FIG. 8A, but the device 105 to be configured is an accessory device in communication with a primary device 852 via a wireless connection 851. The wireless connection 851, in some embodiments, is a Wi-Fi connection. The wireless connection 851, in some embodiments, is a Bluetooth connection. As in FIGS. 1A and 8A, in FIG. 8B the device 105 houses the eUICC 101 which is to be provisioned with the eSIM 106. The location of the eUICC 101 within the device 105 is shown in FIG. 8B using dashed lines. The primary device 852 of FIG. 8B, similar to device 105 in FIG. 8A, is able to connect to the end user 120, the Internet 802, and the wireless base station 804 via connections 121, 822, and 853.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion, or primary, wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 9:
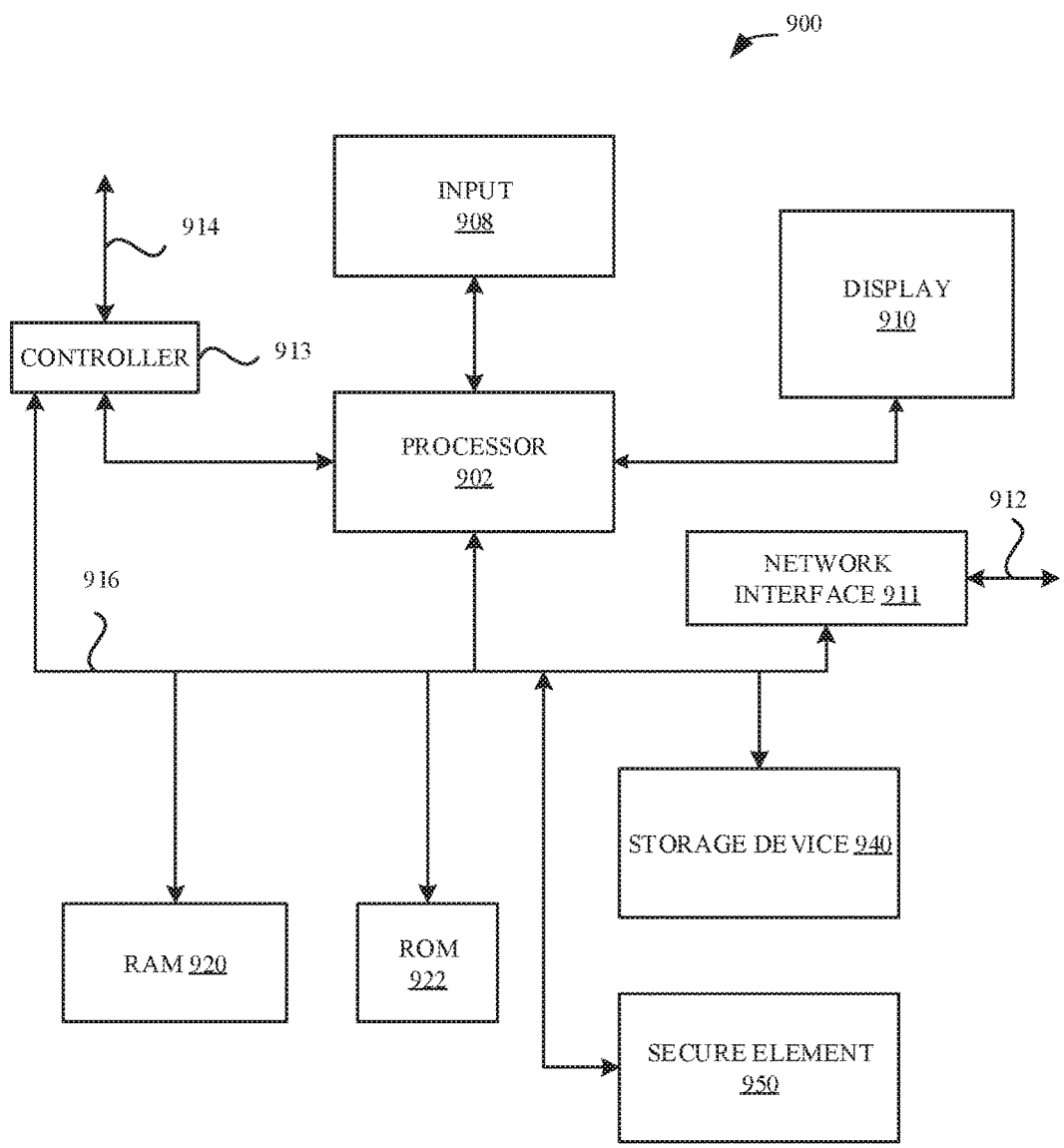
FIG. 9 illustrates an exemplary apparatus for implementation of the embodiments disclosed herein, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the device 105, and/or the eUICC 101 illustrated in FIGS. 1A, 7, 8A, and 8B. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor. The computing device 900 can also include a secure element 950. The secure element 950 can include an eUICC or a UICC. In some embodiments, the computing device 900 includes a baseband processor, one or more radio frequency (RF) transceivers and one or more antennas (not shown).

The computing device 900 also includes a storage device 940, which can comprise a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for installing an electronic subscriber identity module (eSIM) on an embedded universal integrated circuit card (eUICC), the method comprising:
by a device:
receiving, from an eSIM server, a bound profile package (BPP) comprising the eSIM in an encrypted form;
sending a first portion of the BPP to the eUICC at a first time, wherein the eUICC is housed in the device;
receiving a failure code from the eUICC, wherein the failure code indicates a fault in processing the BPP;
when the failure code corresponds to a temporary error:
sending the first portion of the BPP to the eUICC at a second time as part of a renewed installation attempt; and
when the failure code does not correspond to a temporary error:
sending a notification to the eSIM server, wherein the notification is based on the fault.

2. The method of claim 1, further comprising:
subsequent to receiving the failure code:
evaluating a level of a retry counter; and
when the level of the retry counter exceeds a retry threshold:
categorizing the failure code as not corresponding to a temporary error.

3. The method of claim 1, wherein the temporary error is due to an invalid transaction identifier, insufficient device memory, a need to reset the eUICC, and/or a device interruption, wherein the device interruption may be due to an action of a user of the device.

4. The method of claim 1, further comprising:
saving, subsequent to the receiving the BPP, the BPP in a non-volatile memory (NVM) of the device.

5. The method of claim 4, further comprising:
creating an entry in a local profile assistant (LPA) state table, wherein: i) the entry comprises a transaction identifier, a server identifier, logical values indicating whether an eSIM installation flow has started and/or completed, an eSIM identifier, an address of a location of a saved copy of the BPP in the NVM, and/or keys related to the eSIM installation flow, and ii) the LPA state table is stored in the NVM.

6. The method of claim 5, wherein the eSIM identifier comprises an integrated circuit card identifier (ICCID) value.

7. The method of claim 1, further comprising:
performing, subsequent to the receiving the failure code, a corrective action.

8. The method of claim 7, wherein the corrective action comprises:
i) prompting an end user of the device to free memory in the eUICC;
ii) sending a reset signal to the eUICC to restart an operating system of the eUICC;
iii) sending a query to the eUICC; and/or
iv) recovering from a temporary device error.

9. The method of claim 8, wherein the recovering from the temporary device error comprises resetting a baseband processor and/or rebooting the device.

10. The method of claim 8, wherein the prompting comprises prompting the end user to delete an unused eSIM from the eUICC.

11. The method of claim 8, wherein the query prompts the eUICC to provide eUICC state information related to the eSIM installation.

12. The method of claim 8, wherein the query prompts the eUICC to provide remote SIM provisioning (RSP) session information that is persisted in the eUICC.

13. A device comprising:
a memory; and
a processor, the memory including instructions that when executed by the processor cause the device to perform operations comprising:
receiving, from an eSIM server, a bound profile package (BPP) comprising the eSIM in an encrypted form,
sending a first portion of the BPP to the eUICC at a first time, wherein the eUICC is housed in the device,
receiving a failure code from the eUICC, wherein the failure code indicates a fault in processing the BPP,
when the failure code corresponds to a temporary error:
sending the first portion of the BPP to the eUICC at a second time as part of a renewed installation attempt, and
when the failure code does not correspond to a temporary error:
sending a notification to the eSIM server, wherein the notification is based on the fault.

14. The device of claim 13, wherein the operations further comprise:
performing, subsequent to the receiving the failure code, a corrective action.

15. The device of claim 14, wherein the corrective action comprises:
i) prompting an end user of the device to free memory in the eUICC;

ii) sending a reset signal to the eUICC to restart an operating system of the eUICC;

iii) sending a query to the eUICC; and/or iv) recovering from a temporary device error.

16. The device of claim 15, wherein the reset signal causes a reset of a volatile memory in the eUICC.

17. The device of claim 15, wherein the reset signal causes an operating system fault of an operating system of the eUICC to be corrected.

18. The device of claim 15, wherein the operations further comprise:

sending, subsequent to the second time, one or more additional portions of the BPP to the eUICC;

receiving, from the eUICC, a success code;

soliciting, from the eUICC, one or more notifications; and sending a second notification to the eSIM server, wherein the second notification indicates that the renewed installation attempt has been completed successfully.

19. A non-transitory computer readable medium comprising instructions that when executed by a processor of an embedded universal integrated circuit card (eUICC), cause the eUICC to perform operations comprising:

receiving, from a device, one or more portions of a bound profile package (BPP), wherein: i) the BPP comprises an electronic subscriber identity module (eSIM) in an encrypted form, ii) the eUICC is housed in the device, and iii) the one or more portions comprise a first portion received at a first time;

creating an entry in a download state table, wherein: i) the entry comprises a transaction identifier, ii) an eSIM server identifier, and iii) the transaction identifier is associated by the eSIM server with an installation of the eSIM in the eUICC;

detecting an error event, wherein the error event is associated with processing the one or more portions;

sending a failure code to the device, wherein the failure code is based on the error event; and receiving, during a renewed installation attempt of the eSIM in the eUICC, the first portion at a second time later than the first time.

20. The non-transitory computer readable medium of claim 19, wherein the operations further comprise:

receiving, during the renewed installation attempt, a last portion of the BPP at a third time later than the second time;

computing, during the renewed installation attempt, a recomputed session key based on: i) a one-time public key of the eSIM server, and ii) a one-time private key of the eUICC;

deciphering the last portion of the BPP using the recomputed session key to produce a deciphered last portion;

using the deciphered last portion to complete the renewed installation attempt; and sending a success code to the device based on a successful installation of the eSIM in the eUICC.

* * * * *